(12) United States Patent
Chelur

(10) Patent No.: US 8,904,144 B1
(45) Date of Patent: Dec. 2, 2014

(54) METHODS AND SYSTEMS FOR DETERMINING AT RISK INDEX FOR STORAGE CAPACITY

(75) Inventor: Raja S. Chelur, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 160 days.

(21) Appl. No.: 13/480,232

(22) Filed: May 24, 2012

(51) Int. Cl.
G06F 12/02 (2006.01)

(52) U.S. Cl.
CPC .... G06F 12/0238 (2013.01); *G06F 2212/1044* (2013.01)
USPC ............... 711/172; 711/114; 711/E12.008

(58) Field of Classification Search
CPC . G06F 11/008; G06F 12/023; G06F 12/0238; G06F 2212/1032; G06F 2212/1044; G06F 2212/263
USPC ................... 711/114, 172, E12.006
See application file for complete search history.

(56) References Cited

U.S. PATENT DOCUMENTS

| | | | | |
|---|---|---|---|---|
| 7,539,835 B2* | 5/2009 | Kaiser | ............... | 711/170 |
| 2009/0089499 A1* | 4/2009 | Abe et al. | ............... | 711/112 |
| 2009/0300302 A1* | 12/2009 | Vaghani | ............... | 711/162 |
| 2010/0191906 A1* | 7/2010 | Beniyama et al. | ............... | 711/112 |
| 2011/0252214 A1* | 10/2011 | Naganuma et al. | ............... | 711/170 |
| 2012/0151174 A1* | 6/2012 | Matsunaga et al. | ............... | 711/171 |
| 2013/0080727 A1* | 3/2013 | Naito et al. | ............... | 711/165 |
| 2013/0254483 A1* | 9/2013 | Iida | ............... | 711/117 |

* cited by examiner

*Primary Examiner* — Hal Schnee
(74) *Attorney, Agent, or Firm* — LeClairRyan, a Professional Corporation

(57) ABSTRACT

Methods and systems for determining at risk indexes of a plurality of storage containers in a data storage system are disclosed. The available allocated capacities of the storage containers are determined and converted to respective allocated capacities in time periods. The available unallocated capacities of the storage containers are determined and converted to respective unallocated capacities in time periods. The at risk indexes of the storage containers are determined from the sum of the respective allocated capacity in time periods and the respective unallocated capacity in time periods.

23 Claims, 6 Drawing Sheets

STORAGE CAPACITY AT RISK

| TOP | AGGREGATES | VOLUMES | LUNs |
|---|---|---|---|
| STORAGE | | RISK DESCRIPTION | |
| VSL:VOL20 | ⚠ | THIN PROVISIONED VOLUME GROWING AT 2 GB/DAY. 5 DAYS LEFT. | |
| NODE5:AGGR10 | ⚠ | AGGREGATE GROWING AT 7 GB/DAY. NO SPARE DISKS. 8 DAYS LEFT. | |
| VSL:VOL4/LUN5 | ⚠ | THIN PROVISIONED LUN GROWING AT 1 GB/DAY. 15 DAYS LEFT. | |
| VS7:VOL5 | ⚠ | THICK PROVISIONED VOLUME GROWING AT 3 GB/DAY. 19 DAYS LEFT. | |
| VS6:/VOL7 | ⚠ | AUTO GROWN VOLUME GROWING AT 4 GB/DAY. 23 DAYS LEFT TO MAX CAP. | |

*FIG. 6*

STORAGE CAPACITY AT RISK TREND

| THIS MONTH (5) | IN 3 MONTHS (24) | IN 6 MONTHS (37) | |
|---|---|---|---|
| STORAGE | RISK DESCRIPTION | | REQUIRED |
| VSL:VOL20 | ⚠ THIN PROVISIONED VOLUME GROWING AT 2 GB/DAY. 5 DAYS LEFT. | | 200 GB |
| NODE5:AGGR10 | ⚠ AGGREGATE GROWING AT 7 GB/DAY. NO SPARE DISKS. 8 DAYS LEFT. | | 2.5 TB |
| VSL:VOL4/LUN5 | ⚠ THIN PROVISIONED LUN GROWING AT 1 GB/DAY. 5 DAYS LEFT. | | 73 GB |
| VS7:VOL5 | ⚠ THICK PROVISIONED VOLUME GROWING AT 3 GB/DAY. 19 DAYS LEFT. | | 4.2 TB |
| VS6:/VOL7 | ⚠ AUTO GROWN VOLUME GROWING AT 4 GB/DAY. 23 DAYS LEFT TO MAX CAP. | | 178 GB |

FIG. 7

METHODS AND SYSTEMS FOR DETERMINING AT RISK INDEX FOR STORAGE CAPACITY

TECHNICAL FIELD

The invention relates to data storage systems, and, more specifically, to methods and systems for determining an at risk index for storage capacity in data storage systems, which enable storage administrators to take remedial action with respect to data storage systems in a timely manner.

BACKGROUND OF THE INVENTION

The creation and storage of digitized data has proliferated in recent years. Accordingly, techniques and mechanisms that facilitate storage and management of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof.

A data storage system typically includes different classes of storage containers. Each storage container may include a plurality of sub-containers. A storage container may, for example, be a volume, a physical disk, a Redundant Array of Independent Disks (RAID), or an aggregate (e.g., a plurality of RAID groups). Although the term "disk" often refers to a magnetic storage device, in this context a disk may, for example, be a hard disk drive (HDD) or a solid state drive (SSD) or any other media similarly adapted to store data.

In data storage management, it is necessary to ensure that adequate storage capacity exists to prevent one or more storage containers from running out of storage space. If, for example, one or more containers run out of storage space, client systems and applications utilizing the containers may have to be taken off-line so that additional storage capacity may be provided. It will be appreciated that in a data storage system comprising hundreds or even thousands of containers, the data growth rate may vary significantly from container to container depending on client systems and applications to which the containers are provisioned. Accordingly, it is often difficult to monitor the storage capacity of a large number of containers and to ensure that adequate storage capacity is always provided.

Furthermore, existing storage management applications are not configured to adequately determine the storage capacity of certain classes of containers. Existing applications, for example, do not accurately compute the storage capacity of a dynamically expanding volume which is initially provisioned with a small storage resource but dynamically expands as more data is written to it by allocating additional storage resource up to a maximum allowable size. Existing applications show the initial size and the current size but not the maximum allowable size of a dynamically expanding volume.

Also, existing storage management applications do not accurately compute the storage capacity of a thin-provisioned volume which provides an operating system with a virtual hard disk having a large capacity even though the actual capacity is much smaller. For example, by thin-provisioning volumes, a 2 terabyte virtual hard disk may be provided to the operating system, while only few giga bytes of physical storage is allocated. As data is written to the thin-provisioned volume, the real storage space is allocated on the fly.

Furthermore, existing storage management applications do not provide a comprehensive status of the storage capacity of storage systems. Rather, existing applications only provide isolated views of the storage capacity. For example, existing applications identify containers (e.g., aggregates, volumes, Q-trees, etc.) that are nearly full but do not provide reasons why the containers are running out of space. Also, existing applications often highlight issues that are of lesser significance. For example, an aggregate may be identified as being nearly full because volumes in the aggregate are thickly-provisioned. It will be appreciated that in a thickly-provisioned volume, physical storage is allocated at the time of creation of the thickly-provisioned volume although only a small amount of data may have been written to the volume. Thus, existing applications may identify aggregates comprising thickly-provisioned volumes as being nearly full without pointing out that only a small amount of data has in fact been written to the volumes.

Moreover, existing applications fail to highlight significant issues that may require immediate response. For example, an aggregate that is nearly full in a system that does have spare disks is typically not highlighted. It will be appreciated that a failure to indicate that a system lacks spare disks may result in data corruption or unavailability of an aggregate and its volumes when disk space runs out. Also, a volume that is nearly full and does not have auto-grow enabled are not highlighted, which may require client systems relying on the volume to be taken off-line when storage space runs out.

BRIEF SUMMARY OF THE INVENTION

Embodiments of the invention are directed to methods and systems for determining an at risk index for storage capacity of containers in data storage systems. The at risk index provides a comprehensive status of the storage capacity of containers, thereby enabling storage administrators to take remedial action, such as to provide additional storage capacity, in a timely manner.

According to embodiments, a method for determining an at risk index for storage capacity of a plurality of storage containers in a data storage system includes determining available allocated capacities of the storage containers and converting the available allocated capacities to respective allocated capacities in a predetermined time period (e.g., days or another availability metric). The method of embodiments further includes determining available unallocated capacities of the storage containers and converting the available unallocated capacities to respective unallocated capacities in a predetermined time period (e.g., days or another availability metric).

According to embodiments, the total storage capacity in a predetermined time period of the respective storage containers are determined from the sum of the respective allocated capacity in a predetermined time period and the respective unallocated capacity in a predetermined time period. The total storage capacity in a predetermined time period or another availability metric represents the at risk index of the storage container. Thus, the at risk index provides a comprehensive status of the storage capacity by considering both the available allocated capacity in a predetermined time period and available unallocated capacity in a predetermined time period, thereby enabling storage administrators to respond in a timely manner. The storage containers whose at risk index is less than a threshold value are identified and the containers are ranked.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 6 shows a computer screen view of the storage capacity of storage containers in a storage system; and FIG. 7 shows a computer screen view of the storage capacity of storage containers at risk of running out of storage space.

DETAILED DESCRIPTION OF THE INVENTION

Embodiments of the invention are directed to methods and systems for determining an at risk index for storage capacity of storage containers in a data storage system. According to embodiments, a comprehensive status of storage containers is provided, enabling, for example, storage administrators to identify storage containers at risk of running out of storage space, how soon additional storage capacity should be added, and why one or more storage containers are at risk of running out of storage space.

Figure 1:
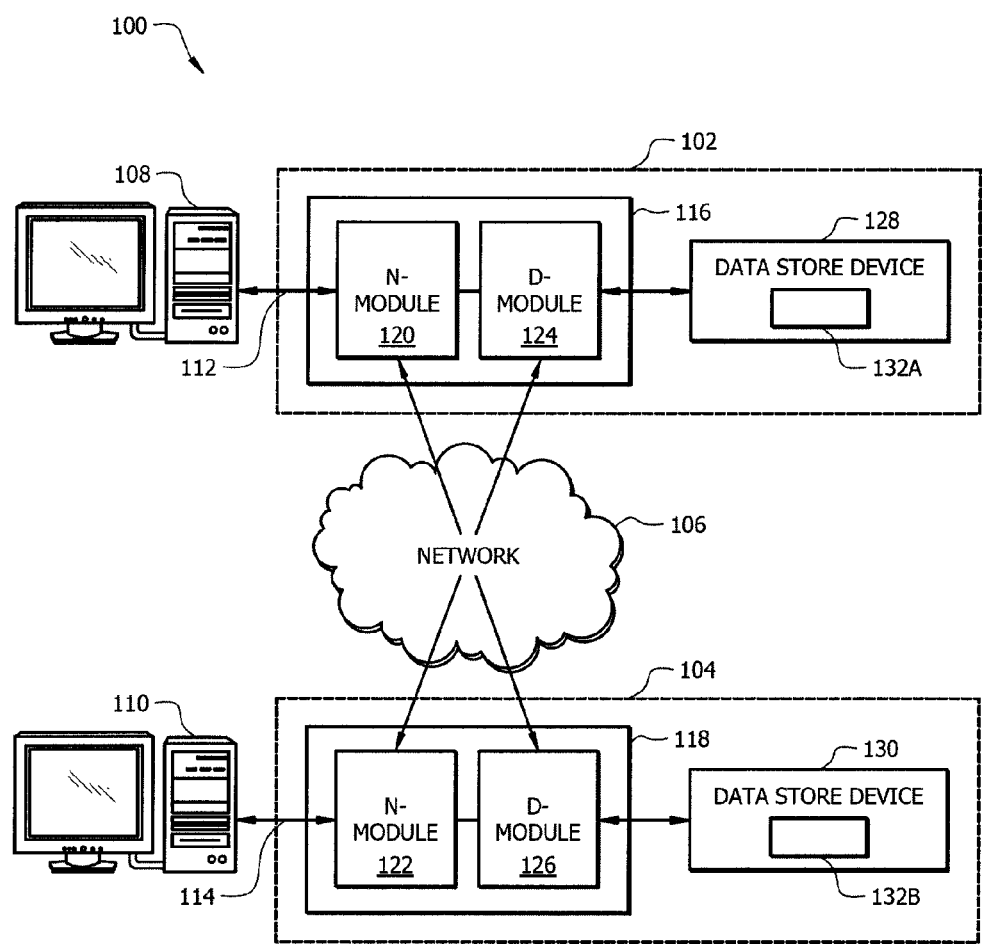
FIG. 1 shows a block diagram of a clustered network environment.

FIG. 1 shows a block diagram of system 100 which comprises an exemplary clustered network environment in which data storage systems 102 and 104 are coupled via a network 106. Embodiments of the invention may be utilized to determine an at risk index for storage capacity of containers in data storage systems 102 and 104. It will be apparent that embodiments of the invention may be utilized to determine an at risk index of containers in other types of storage systems (e.g., non-clustered storage systems).

Data storage systems 102 and 104 of embodiments may comprise one or more modules, components, etc. operable to provide operation as described herein. For example, data storage systems 102 and 104 of the illustrated embodiment comprise nodes 116 and 118 and data store devices 128 and 130, respectively. It should be appreciated that the nodes and/or data store devices of the data storage systems 102 and 104 may themselves comprise one or more modules, components, etc. Nodes 116 and 118 of the illustrated embodiment comprise network modules (referred to herein as "N-Modules") 120 and 122 and data modules (referred to herein as "D-Modules") 124 and 126, respectively. Although data storage systems 102 and 104 are illustrated as each having only one N-Module and one D-Module, it will be apparent that data storage systems 102 and 104 may be configured each with a plurality of N-Modules and D-Modules. According to embodiments, a program code or software for determining an at risk index for storage capacity of containers in data storage systems portions of which may reside in client 108 and/or client 110, such as part of a storage management application, and portions of which may reside in the data storage systems 102 and/or 104 of system 100.

The modules, components, etc. of data storage systems 102 and 104 may comprise various configurations suitable for providing operation as described herein. For example, nodes 116 and 118 may comprise processor-based systems, such as file server systems, computer appliances, computer workstations, etc. Accordingly, nodes 116 and 118 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Data store devices 128 and 130 may, for example, comprise disk memory, flash memory, optical memory, solid state drives, and/or other suitable computer readable media. Data store devices 128 and 130 may be considered one class of containers. Data store devices 128 and 130 may be divided into a plurality of sub-containers and they in turn may be divided into other sub-containers. By way of example, data store devices 128 and 130 may each be a hard disk out of which a plurality of volumes may be provisioned, and the volumes in turn may be divided into a plurality of Q-trees. A Q-tree is a subset of a volume to which a quota may be applied to limit its size. Data store devices 128 and 130 in turn may operate as sub-containers of a RAID group.

Data modules 124 and 126 of nodes 116 and 118 may be adapted to communicate with data store devices 128 and 130 according to a storage area network (SAN) protocol (e.g., small computer system interface (SCSI), fiber channel protocol (FCP), INFINIBAND, etc.) and thus data store devices 128 and 130 may appear as locally attached resources to the operating system. That is, as seen from an operating system on nodes 116 and 118, data store devices 128 and 130 may appear as locally attached to the operating system. In this manner, nodes 116 and 118 may access data blocks through the operating system, rather than expressly requesting abstract files.

Network modules 120 and 122 may be configured to allow nodes 116 and 118 to connect with client systems, such as clients 108 and 110 over network connections 112 and 114. In the exemplary embodiment, clients 108 and 110 may comprise traditional server systems sending data storage and retrieval requests to nodes 116 and 118. Moreover, network modules 120 and 122 may provide connections with one or more other components of system 100, such as through network 106. For example, network module 120 of node 116 may access data store device 130 via communication network 106 and data module 126 of node 118. The foregoing operation provides a clustered storage system configuration for system 100.

Clients 108 and 110 of embodiments comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein.

Network 106 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 106, or a portion thereof may provide infrastructure of network connections 112 and 114 or, alternatively, network connections 112 and/or 114 may be provided by network infrastructure separate from network 106, wherein such separate network infrastructure may itself comprise a SAN, the Internet, the PSTN, a LAN, a MAN, a WAN, a wireless network, and/or the like.

Figure 2:
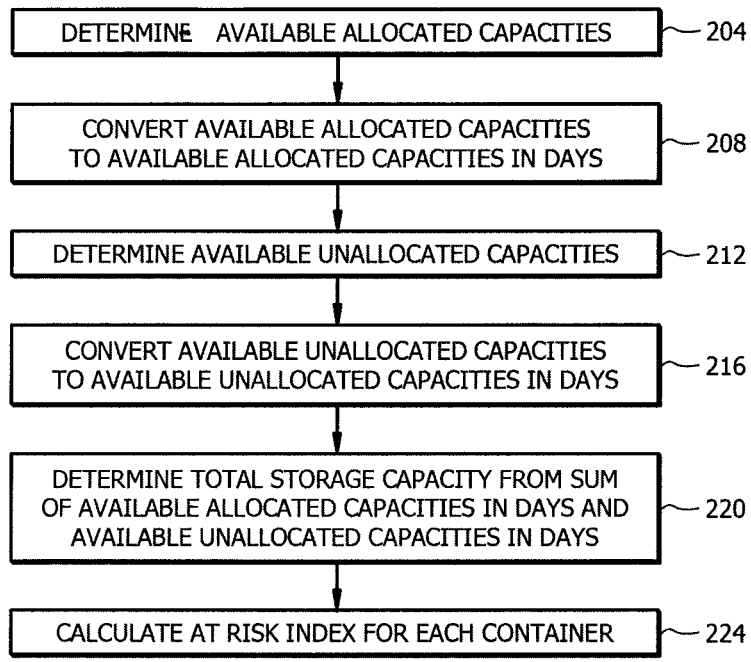
FIG. 2 is a flow diagram of method steps for determining an at risk index of the storage capacity of storage containers.

FIG. 2 is a flow diagram of method steps for determining an at risk index for a storage container (e.g., data store device 128 or 130) according to embodiments of the invention. In step 204, the available allocated capacity of the storage container is determined. According to embodiments, the storage systems 102 and/or 104 maintain various container information such as, for example, the available allocated capacity of the storage container, and such information may be obtained by clients 108 and 110 using an API. The available allocated capacity of a storage container is defined as the allocated capacity of the storage container still available for growth. By way of example, a storage container (e.g., volume) having 10 GB of allocated storage space may have 5 GB of data written to it, thus 5 GB of allocated storage space is still remaining available for growth. This remaining 5 GB of storage space is considered the available allocated capacity.

In step 208, the available allocated capacity of the storage container in the exemplary embodiment is converted into allocated capacity in a predetermined time period (e.g., days or another availability metric). According to embodiments, the allocated capacity in a predetermined time period is computed by dividing the available allocated capacity by the growth rate of the container. The growth rate may be determined by dividing the total amount of data being written to the container over a predetermined time period (e.g., days, week or month) by the predetermined time period. According to embodiments, information regarding the total amount of data being written to the container over a predetermined time period may be determined by storage systems 102 and/or 104, and the information may be obtained by clients 108 and/or 110 periodically using an API. A storage management application may, for example, periodically collect information regarding the amount of data being written to the container over a predetermined time period and maintain this record in a database. A linear regression may be performed on this record over a predetermined time period (e.g., 90 days) to determine the growth rate.

By way of example, consider that a container has 5 GB of available allocated capacity and a growth rate of 0.5 GB/day. Accordingly, the allocated capacity in days is (5 GB)/(0.5 GB/day) or 10 days.

In step 212, the available unallocated capacity of the storage container is determined. According to embodiments, the available unallocated capacity of a storage container is defined as the capacity available (i.e., unallocated capacity) in its parent container. In a storage system having a hierarchy of storage containers, one or more logical unit numbers (LUNs) may reside inside a volume and one or more volumes may reside inside an aggregate. Accordingly, a volume may be considered the parent container of the LUNs and an aggregate may be considered the parent container of the volumes. Thus, the available unallocated capacity of a volume is the unallocated capacity of its parent container which may be an aggregate. For example, a 60 GB aggregate may be provisioned into three 15 GB volumes. Accordingly, the available unallocated capacity of each of the three volumes is 15 GB. According to embodiments, the available unallocated capacity of a container may be calculated by storage systems 102 and/or 104, and this information may be obtained by clients 108 and/or 110 by an API.

In step 216, the available unallocated capacity of the storage container is converted into unallocated capacity in a predetermined time period. According to embodiments, the unallocated capacity in a predetermined time period of a container is computed by dividing the available unallocated capacity by the growth rate of all containers sharing the same parent container. As discussed before, a storage management application may, for example, calculate the growth rate using a linear regression method based on a capacity use history that is maintained.

In step 220, the total storage capacity of the container is determined from the sum of the allocated capacity and the unallocated capacity. Thus, for example, the total storage capacity of a container (e.g., volume, disk, aggregate, etc.) may be 30 days when represented in days. In other words, the container has 30 days of storage space available at its current growth rate until the container runs out of storage space. According to embodiments, the total storage capacity in a predetermined time period represents the at risk index of storage capacity of the storage container.

In step 224, the at risk index is calculated for each container (e.g., Q-trees, volumes, aggregates, etc.) in the storage system using the foregoing steps. According to embodiments, a storage management application computes the at risk index for the storage containers and the result is stored in the storage management application's database. By calculating the at risk index for each container in the storage system, all containers and their sub-containers are analyzed, which provides a comprehensive status of the storage capacity of the storage system. Consider, for example, three volumes V1, V2 and V3 are provisioned in an aggregate A1. By calculating the at risk index of V1, V2, V3 and A1, the storage management application can monitor the storage status of not only V1, V2 and V3, but also the impact of the growth rate of V1, V2 and V3 on each other. Because the at risk index of A1 is a function of the at risk indices of V1, V2 and V3 and because V1, V2 and V3 each may grow into A1, the storage management application can monitor the impact of the growth rate of V1, V2 and V3 on each other by considering the at risk index of A1.

The at risk index according to embodiments not only considers the available allocated capacity of a storage container but also its available unallocated capacity. In other words, the at risk index not only reflects the allocated physical storage capacity but also the unallocated physical storage capacity into which the container may grow. Thus, the at risk index provides a comprehensive status of the storage capacity of the container, thereby enabling a storage administrator to take remedial measures in a timely manner.

By providing the at risk index in an availability metric such as, for example, in days or another predetermined time period rather than in storage units (e.g., GB), embodiments of the invention allow a system administrator to easily determine how soon and how much additional storage capacity should be provided. Thus, for example, if the at risk index of a storage container is 15 days, a storage administrator has approximately 15 days to provide additional storage space, assuming usage patterns remain the same as historical usage patterns. Also, the storage administrator is able to make an informed decision about how much storage capacity needs to be added based on the current growth rate. Also as discussed before, by considering the at risk index of each container in the storage system, a system administrator can monitor the storage status of not only individual containers, but also the impact of the growth rate of the containers on each other, which allows the system administrator to provide additional storage capacity in a timely manner. Accordingly, the at risk index may be displayed to an administrator console to alert the system administrator for further actions.

It will be appreciated that if the at risk index is expressed in storage units (e.g., 2 GB), it may be misleading or may fail to convey a comprehensive status of the storage system. While 2 GB may not appear to be a significant amount of storage space, if the daily growth rate of the container is only 0.05 GB, there are still 40 days of storage capacity available. Thus, while the container may only have 2 GB space remaining, there is still adequate space available due to the low daily growth rate. On the other hand, if a container has a total storage capacity of 20 GB but a daily growth rate of 10 GB, the storage container is at risk of running out of storage space in 2 days.

Figure 3:
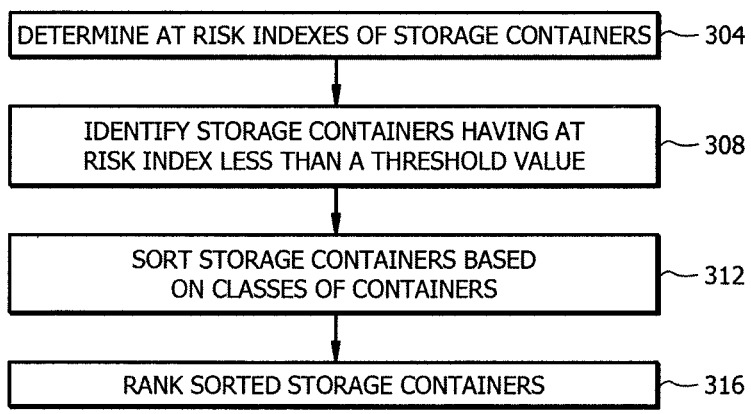
FIG. 3 is a flow diagram of method steps for identifying and ranking storage containers at risk of running out of storage capacity.

FIG. 3 is a flow diagram of method steps for identifying and ranking storage containers at risk of running out of storage capacity according to embodiments. In step 304, the at risk index (e.g., storage capacity in days or any other predetermined time period) of each storage container in the storage system is determined as discussed above. In step 308, the storage containers whose at risk index is less than a threshold value are identified. According to embodiments, a storage management application may provide the threshold value based on past usage of storage resources or may allow a storage administrator to set the threshold value. Thus, for example, if the threshold value is 10 days, storage containers having an at risk index less than 10 days may be identified. According to embodiments, the identified storage containers are considered being at risk of running out of storage capacity. One or more storage management provisions may be initiated in response to such at risk indexes being below the predetermined threshold value. For example, a storage management provision, such as providing additional storage space to the identified storage containers, may be initiated in response to the at risk index being below the predetermined threshold value.

In step 312, the storage containers at risk of running out of storage space are sorted or classified based on different classes of containers, also referred to herein as container-types. Thus, the storage containers are sorted, for example, into volumes, Q-trees, and aggregates. According to embodiments, a storage management application periodically computes the at-risk index for the storage objects. The result is persisted in the management application's database. The storage management application may retrieve the at risk index of all storage containers and sort the storage containers based on container-types. By sorting the storage containers based on the different classes of containers or container-types, embodiments of the invention not only identify the storage containers at risk of running out of space, but also identify the different classes of containers at risk of running out of storage space, thus providing a more comprehensive status of the storage system. In certain circumstances, the storage management application may take measures such as, for example, sending a notification to the storage administrator regarding the at risk condition. Accordingly, if a container (e.g., volume) is identified as being at risk of running out of storage space but its parent container (e.g., aggregate) still has adequate storage space available to which the sub-container may grow into if necessary, a system administrator may decide not to provision additional storage space for that container. If, on the other hand, a storage container is identified as being at risk of running out of space and its parent container does not have available capacity into which the sub-container may grow into, a system administrator may promptly provision additional storage space for the container as well as its parent container.

In step 316, the sorted storage containers are ranked or ordered based on their respective at risk index. For example, the different classes of containers (e.g., volumes, Q-trees, disks and aggregates) may be ranked and displayed in a decreasing order based on their respective at risk index.

As noted before, the at risk index of a container according to embodiments is the sum of its allocated capacity in a predetermined time period and its unallocated capacity in a predetermined time period. It will be appreciated that the allocated capacity in a predetermined time period and the unallocated capacity in a predetermined time period depends on the class of container (e.g., controller, aggregate, volume, Q-tree, etc.). According to embodiments, storage systems 102 and/or 104 may define the storage containers into container-types at the time system 100 is created, and this information may be provided to clients 108 and 110.

Figure 4:
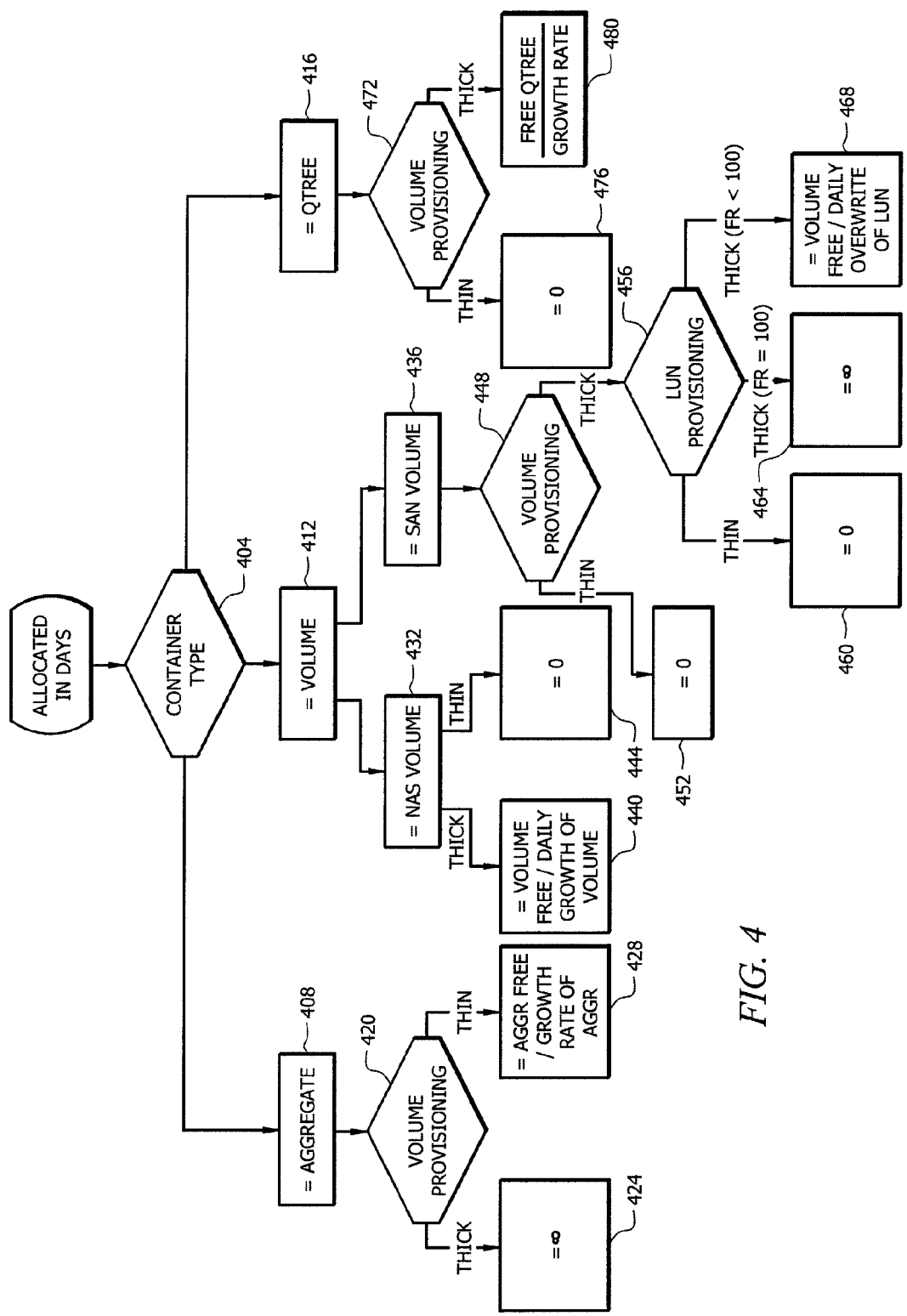
FIG. 4 is a flow diagram of method steps for determining the allocated capacity in days of a storage container.

FIG. 4 is a flow diagram of the method steps for determining the allocated capacity in days of a container in accordance with embodiments of the invention. In decision block 404, the container-type is determined. If the container is an aggregate, the flow moves to step 408, and if the container is a volume, the flow moves to step 412, and if the container is a Q-tree, the flow moves to step 416.

If the container is an aggregate, the flow moves from step 408 to decision block 420 to determine how the volumes inside the aggregate are provisioned. According to some embodiments, the information regarding how the volumes inside the aggregate are provisioned are considered attributes of storage systems 102 and/or 104 and this information may be provided by the storage systems via an API. If the volumes are thick-provisioned, the flow moves to step 424 where according to embodiments a value of infinity (or another predetermined value) is assigned as the allocated capacity in days, and this value may be assigned by the storage systems as a configuration attribute. It will be appreciated that for thick-provisioned volumes, data blocks in an aggregate in which the volumes are provisioned are pre-allocated. Thus, the aggregate may not run out of space although the volumes within the aggregate may run out of space, and accordingly the value of infinity is assigned as the allocated capacity in days.

If the volumes are thin-provisioned, the flow moves to step 428 where the allocated capacity in days is determined by dividing the free capacity of the aggregate by the daily growth rate of the aggregate. According to embodiments, the free capacity of an aggregate is defined as the free space available in the aggregate.

Referring back to step 412, if the volume is a network attached storage (NAS) volume, the flow moves to step 432. If the NAS volume is thick-provisioned, the allocated capacity in days of the container is determined in step 440 by dividing the free space available in the volume by the daily growth rate of the volume. It will be appreciated that if the NAS volume is thick-provisioned, the volume will run out of space when the allocated space is used up. In contrast, if a thick-provisioned volume is created inside an aggregate, the aggregate will not run out of space while the volume may run out of space and thus a value of infinity was assigned in step 424.

If the NAS volume is thin-provisioned, in step 444 the allocated capacity in days is assigned a zero value It will be appreciated that since the NAS volume is thin-provisioned, and hence does not have any space pre-allocated, a zero value is assigned as the available allocated capacity in days.

Referring back to step 412, if the volume is a storage area network (SAN) volume, the flow moves to step 436. Next, in decision block 448 the provisioning of the SAN volume is determined. If the volume is thin-provisioned, in step 452 a zero value is assigned to the allocated capacity in days. If the volumes are thick-provisioned, in decision block 456 the provisioning of the LUNs inside the volume is determined. If the LUNs are thin-provisioned, in step 460 a zero value is assigned to the allocated capacity in days, and this zero value may be assigned by the storage systems as a configuration attribute. If the LUNs are thick-provisioned and their fractional reserve is 100, in step 464 a value of infinity is assigned to the allocated capacity in days, and this value may be assigned by the storage systems as a configuration attribute. If the LUNs are thick-provisioned and their fractional reserve is less than 100, in step 468 the allocated capacity in days is determined by dividing free volumes by daily overwrite of LUNs. It will be appreciated that a LUN may have additional space pre-allocated to cover for data being overwritten. The additional space is considered the fractional reserve, and according to embodiments the fractional reserve value may be assigned by the storage systems as a configuration attribute. The fractional reserve may be stored in the storage management application database and retrieved periodically to support the at risk index computation. By way of example, if the fractional reserve is 100, then 100% equivalent of the size of the LUN is pre-allocated. According to embodiments, if the LUN's fractional reserve is 100, its allocated capacity is assigned a value of infinity. The information regarding fractional reserve according to embodiments may be provided by storage systems 102 and/or 104 to clients 108 and/or 100.

Referring back to step 416, the flow moves to decision block 472 to determine the provisioning of the volumes in the Q-tree. If the volumes are thin-provisioned, in step 476 a zero value is assigned to the allocated capacity in days. If the volumes are thick-provisioned, in step 480 the allocated capacity in days is determined by dividing the free space of the Q-tree by the daily growth rate of the Q-tree. According to embodiments, the free space of the Q-tree is defined as the available space in the Q-tree, and the daily growth rate of the Q-tree is defined as the rate at which data is being written to the Q-tree.

Figure 5:
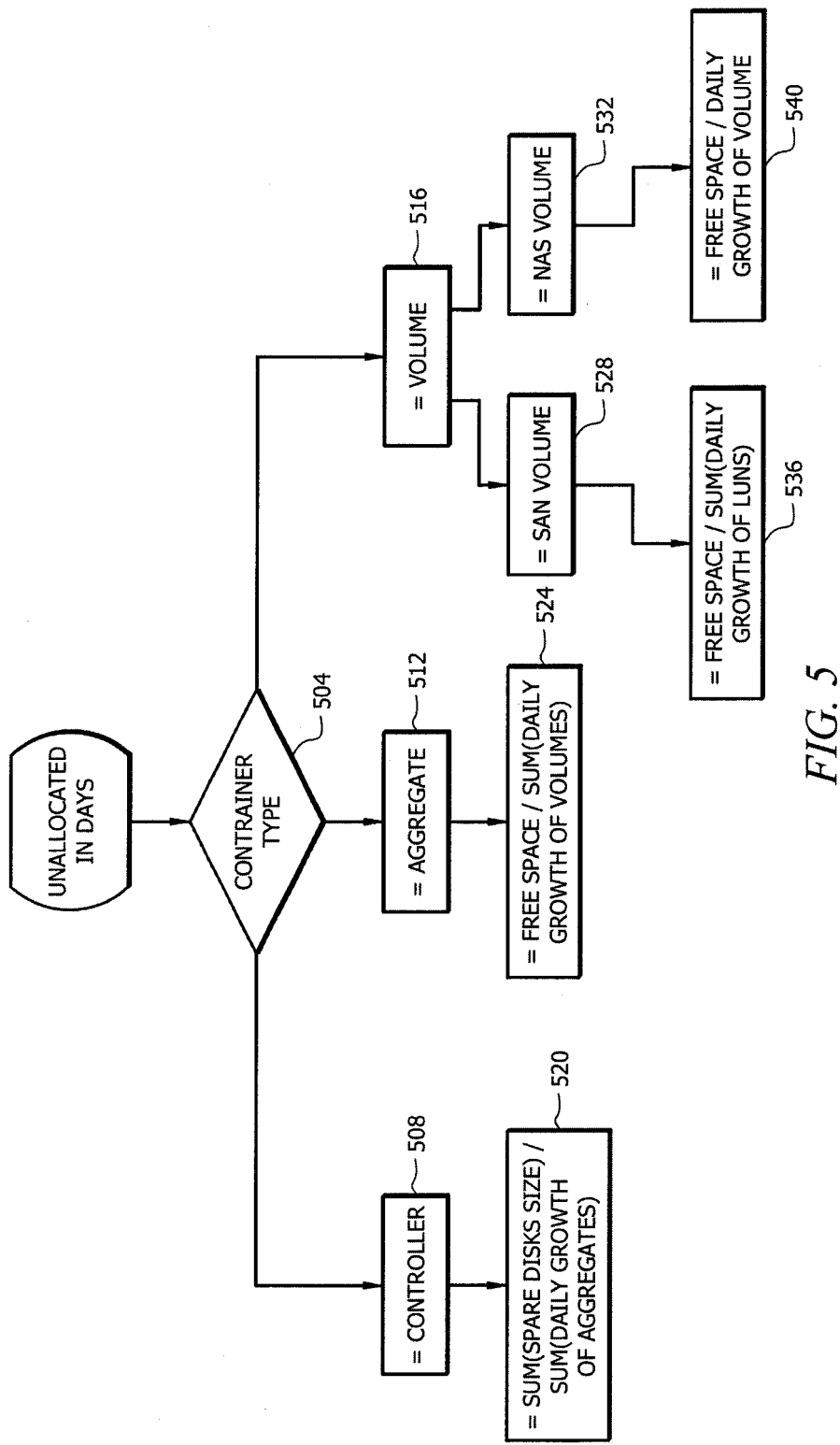
FIG. 5 is a flow diagram of method steps for determining the unallocated capacity in days of a storage container.

FIG. 5 is a flow diagram of method steps for determining the unallocated capacity in days of a container in accordance with embodiments. In decision block 504, the container-type is determined. According to embodiments, the storage systems 102 and/or 104 maintain various container information such as, for example, container-types and such information may be obtained by clients 108 and 110 using an API. If the container is a controller, the flow moves to step 508. In step 520, the unallocated capacity in days of the controller is determined by dividing the sum of spare disk size by the sum of daily growth rate of aggregates. According to embodiments, information regarding spare disk size may be provided by storage systems 102 and/or 104. It will be appreciated that the spare disk size refers to the size of a spare disk not yet assigned to an aggregate. A spare disk is used for providing additional capacity to an aggregate or in the event of a disk failure to provide a replacement. Thus, the unallocated capacity of a controller is the number of spare disks available to the controller.

Referring back to step 504, if the container is an aggregate, the flow moves to step 512. In step 524, the unallocated capacity in days of the aggregate is determined by dividing the free space of the aggregate by the sum of the daily growth rate of volumes in the aggregate.

Referring back to step 504, if the controller is a volume, the flow moves to step 516. If the volume is a SAN volume, the flow moves to step 528 and in step 536 the unallocated capacity in days of the SAN volume is determined by dividing the free space of the volume by the sum of the daily growth rate of the LUNs. If the volume is a NAS volume, the flow moves to step 532 and in step 540 the unallocated capacity of the NAS volume is determined by dividing the free space volume by the daily growth rate of the volumes.

After the allocated capacity in days and the unallocated capacity in days are computed, the total storage capacity in days of the container is computed from the sum of the allocated capacity in days and the unallocated capacity in days. The total storage capacity in days represents the at risk index of the container. Consider, for example, a container's allocated capacity in days is 10 days and its unallocated capacity in days is 5 days. Thus, its total allocated capacity is 15 days, which represents the at risk index of the container.

According to embodiments of the invention, the results from the preceding steps may be organized and displayed. FIG. 6 shows a computer screen view of the at risk index of containers in an exemplary storage system, which organizes containers based on those at the highest risk of running out of storage space and also based on the different classes of containers. For example, selecting a tab labeled "Top" displays those containers, regardless of the class of container, at the highest risk of running out of storage space. Selecting tabs labeled "Aggregate", "Volumes" or "LUNs" displays the respective classes of containers at risk of running out of storage space.

FIG. 7 shows a computer screen view of at risk index of containers organized by those at risk or running out of storage space this month, in 3 months and in 6 months, thus enabling a storage administrator to identify and prioritize containers in need of additional storage capacity. It will be appreciated that the concepts of the embodiments may be used to organize and display storage capacity in other ways.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining at risk indexes of storage capacity of a plurality of storage containers in a data storage system, the method comprising:
   determining, by a storage management computing device, available allocated capacities of the plurality of storage containers;
   converting, by the storage management computing device, the available allocated capacities to respective allocated capacities in a predetermined time period by dividing each available allocated capacity by a growth rate of each respective one of the plurality of storage containers;
   determining, by the storage management computing device, available unallocated capacities of the plurality storage containers;
   converting, by the storage management computing device, the available unallocated capacities to respective unallocated capacities in the predetermined time period by dividing each available unallocated capacity by a growth rate of all storage containers sharing a parent storage container with the respective storage container; and
   determining, by the storage management computing device, the at risk indexes from a sum of the respective allocated capacities in the predetermined time period and the respective unallocated capacities in the predetermined time period, the at risk indexes indicating which the plurality of storage containers are at risk of running out of storage space.

2. The method of claim 1, further comprising ranking, by the storage management computing device, the at risk indexes of the plurality of storage containers.

3. The method of claim 1, wherein the at risk indexes indicate a number of days left before running out of storage space.

4. The method of claim 1, further comprising identifying, by the storage management computing device, storage containers of the plurality of storage containers whose at risk index is less than a threshold value as being at risk of running out of data storage space.

5. The method of claim 1, wherein the available unallocated capacities of the plurality of storage containers are available capacities in respective parent containers.

6. The method of claim 1, wherein a container of the plurality of storage containers is a thin-provisioned volume.

7. The method of claim 1, wherein the allocated capacities in the predetermined time period is determined from an allocated capacity of a parent container available for growth and a growth rate of the parent container.

8. The method of claim 1, wherein the plurality of storage containers comprise a thick-provisioned volume network attached storage (NAS).

9. The method of claim 8, wherein the allocated capacities in the predetermined time period of the NAS thick-provisioned volume are determined from a free storage capacity of the NAS thick-provisioned volume and daily growth of the NAS thick-provisioned volume.

10. The method of claim 1, wherein the plurality of storage containers comprise a thin-provisioned volume network attached storage (NAS).

11. The method of claim 10, wherein the allocated capacities in the predetermined time period of the NAS, thin-provisioned volume are zero.

12. A non-transitory computer readable medium having stored thereon instructions for determining at risk indexes of storage capacity of a plurality of storage containers in a data storage system comprising machine executable code which when executed by at least one processor, causes the processor to perform steps comprising:
   determining available allocated capacities of the plurality of storage containers;
   converting the available allocated capacities to respective allocated capacities in a predetermined time period by dividing each available allocated capacity by a growth rate of each respective one of a plurality of storage containers;
   determining available unallocated capacities of the plurality storage containers;
   converting the available unallocated capacities to respective unallocated capacities in the predetermined time period by dividing each available unallocated capacity by a growth rate of all storage containers sharing a parent storage container with the respective storage container; and
   determining the at risk indexes from a sum of the respective allocated capacities in the predetermined time period and the respective unallocated capacities in the predetermined time period, the at risk indexes indicating which the plurality of storage containers are at risk of running out of storage space.

13. The medium as set forth in claim 12 further comprising:
   ranking the at risk indexes of the plurality of storage containers; and
   identifying storage containers of the plurality of storage containers whose at risk index is less than a threshold value as being at risk of running out of data storage space.

14. The medium as set forth in claim 12 wherein:
   the at risk indexes indicate a number of days left before running out of storage space;
   the available unallocated capacities of the plurality of storage containers are available capacities in respective parent containers;
   a container of the plurality of storage containers is a thin-provisioned volume; and
   the allocated capacities in the predetermined time period are determined from an allocated capacity of a parent container available for growth and a growth rate of the parent container.

15. The medium as set forth in claim 12 wherein the allocated capacities in the predetermined time period is determined from an allocated capacity of a parent container available for growth and a growth rate of the parent container.

16. The medium as set forth in claim 12 wherein:
   the plurality of storage containers comprise a thick-provisioned volume network attached storage (NAS);
   wherein the allocated capacities in the predetermined time period of the NAS thick-provisioned volume are determined from a free storage capacity of the NAS thick-provisioned volume and daily growth of the NAS thick-provisioned volume.

17. The medium as set forth in claim 12 wherein:
   the plurality of storage containers comprise a thin-provisioned volume network attached storage (NAS); and the allocated capacities in the predetermined time period of the NAS, thin-provisioned volume are zero.

18. A storage management computing device comprising:
a processor;
a memory, wherein the memory coupled to the processor are configured to execute programmed instructions stored in the memory comprising:
determining available allocated capacities of a plurality of storage containers;
converting the available allocated capacities to respective allocated capacities in a predetermined time period by dividing each available allocated capacity by a growth rate of each respective one of the plurality of storage containers;
determining available unallocated capacities of the plurality storage containers;
converting the available unallocated capacities to respective unallocated capacities in the predetermined time period by dividing each available unallocated capacity by a growth rate of all storage containers sharing a parent storage container with the respective storage container; and
determining the at risk indexes from a sum of the respective allocated capacities in the predetermined time period and the respective unallocated capacities in the predetermined time period, the at risk indexes indicating which the plurality of storage containers are at risk of running out of storage space.

19. The device as set forth in claim 18 wherein the processor is further configured to execute programmed instructions stored in the memory further comprising:
ranking the at risk indexes of the plurality of storage containers; and
identifying storage containers of the plurality of storage containers whose at risk index is less than a threshold value as being at risk of running out of data storage space.

20. The device as set forth in claim 18 wherein:
the at risk indexes indicate a number of days left before running out of storage space;
the available unallocated capacities of the plurality of storage containers are available capacities in respective parent containers;
a container of the plurality of storage containers is a thin-provisioned volume; and
the allocated capacities in the predetermined time period are determined from an allocated capacity of a parent container available for growth and a growth rate of the parent container.

21. The device as set forth in claim 18 wherein the allocated capacities in the predetermined time period is determined from an allocated capacity of a parent container available for growth and a growth rate of the parent container.

22. The device as set forth in claim 18 wherein:
the plurality of storage containers comprise a thick-provisioned volume network attached storage (NAS);
wherein the allocated capacities in the predetermined time period of the NAS thick-provisioned volume are determined from a free storage capacity of the NAS thick-provisioned volume and daily growth of the NAS thick-provisioned volume.

23. The device as set forth in claim 18 wherein:
the plurality of storage containers comprise a thin-provisioned volume network attached storage (NAS); and
the allocated capacities in the predetermined time period of the NAS, thin-provisioned volume are zero.

* * * * *